United States Patent

Archibald et al.

Patent Number: 5,405,663
Date of Patent: Apr. 11, 1995

[54] MICROWAVE PACKAGE LAMINATE WITH EXTRUSION BONDED SUSCEPTOR

[75] Inventors: William E. Archibald, Fullerton; Cynthia G. Scrimager, Anaheim, both of Calif.

[73] Assignee: Hunt-Wesson, Inc., Fullerton, Calif.

[21] Appl. No.: 791,782

[22] Filed: Nov. 12, 1991

[51] Int. Cl.⁶ ............... B65D 85/00; B65D 81/34; B65B 29/08

[52] U.S. Cl. ............... 428/34.3; 428/148; 428/216; 428/458; 428/463; 428/480; 428/481; 428/910; 383/113; 383/116; 426/107; 426/126; 426/243

[58] Field of Search ............ 428/34.2, 34.3, 359, 428/457, 463, 481, 216, 148, 910, 458, 480; 219/10.55 E, 10.55 M; 427/271, 124, 250, 265, 404; 426/107, 234, 243, 126; 383/116, 120, 113; 229/DIG. 3; 156/651

[56] References Cited

U.S. PATENT DOCUMENTS

| | | | |
|---|---|---|---|
| 4,327,136 | 4/1982 | Thompson et al. | 219/10.55 E |
| 4,518,651 | 5/1985 | Wolfe, Jr. | 219/10.55 E |
| 4,735,513 | 4/1988 | Watkins et al. | 383/116 |
| 4,765,999 | 8/1988 | Winter | 428/480 |
| 4,851,287 | 7/1989 | Hartsing, Jr. | 428/480 |
| 4,861,957 | 8/1989 | Welles | 219/10.55 E |
| 4,880,695 | 11/1989 | Rudd et al. | 428/480 |
| 4,904,836 | 2/1990 | Turpin et al. | 219/10.55 E |
| 4,927,991 | 5/1990 | Wendt et al. | 219/10.55 E |
| 4,946,743 | 8/1990 | Winter | 428/480 |
| 4,982,064 | 1/1991 | Hartman et al. | 219/10.55 E |
| 4,985,606 | 1/1991 | Faller | 219/10.55 E |
| 5,021,293 | 6/1991 | Huarg et al. | 428/480 |
| 5,038,009 | 8/1991 | Babbitt | 219/10.55 E |
| 5,049,714 | 9/1991 | Beresniewicz et al. | 219/10.55 E |
| 5,059,279 | 10/1991 | Wilson | 219/10.55 E |
| 5,081,330 | 1/1992 | Brandberg et al. | 219/10.55 E |
| 5,147,726 | 9/1992 | Suzuki et al. | 428/458 |
| 5,170,025 | 12/1992 | Perry | 219/10.55 E |

FOREIGN PATENT DOCUMENTS

2022977 4/1979 United Kingdom .

Primary Examiner—Ellis P. Robinson
Assistant Examiner—Rena L. Dye
Attorney, Agent, or Firm—Pretty, Schroeder, Brueggemann & Clark

[57] ABSTRACT

A laminate for use in microwave cooking which includes a susceptor formed by depositing a thin layer of microwave-interactive material on a plastic base sheet, and then extrusion bonding that susceptor to a plastic coated paper sheet, without the use of an adhesive.

13 Claims, 2 Drawing Sheets

MICROWAVE PACKAGE LAMINATE WITH EXTRUSION BONDED SUSCEPTOR

FIELD OF THE INVENTION

The present invention relates to laminates for use in packaging of microwaveable foods, and particularly to such laminates carrying a susceptor.

BACKGROUND OF THE INVENTION

Susceptors are used in microwave heating of food products to convert microwave energy to heat. They are particularly useful in connection with such products as popcorn, which does not initially respond as well as desired to the direct application of microwave energy. Susceptors are also used with products such as meat, pizza crust and other baked goods that require browning or crisping of the outer surface.

A typical susceptor includes a thin layer of microwave-interactive material, such as aluminum, that is too thin to be self supporting and is deposited on a substrate of a plastic film. However, the base sheet tends to break up, shrivel, or otherwise lose its integrity when heated. It is therefore conventional to adhesively mount the base sheet on a paper sheet, which can form a part of the structure of the container.

The adhesive used to bond a susceptor to a base sheet must retain its bonding properties and remain non-toxic when heated, and must be suitable for high volume production. These basic requirements eliminate from consideration most known, commercially available adhesives. Delamination of the susceptor from the base sheet is a problem that persists and should be avoided, particularly when the susceptor is directly exposed to the food. The need to avoid delamination may impose manufacturing requirements, particularly relating to the application of the adhesive that can be problematic on a mass production basis.

It will thus be understood that there is a need for an improved and reliable susceptor/laminate construction that readily lends itself to mass production.

SUMMARY OF THE INVENTION

In general terms, the present invention is a laminate in which a susceptor is bonded to a sheet of paper, without the use of adhesives. The laminate of the invention may be used to form a part of a disposable container for microwaveable food, such as popcorn bags, or it may be included as an insert in such containers. When the laminate is used to form a part of a container, such as a popcorn bag, the susceptor may be positioned so that it is exposed on an inside surface of the container.

The susceptor, which is a part of the laminate, is usually formed by vacuum-depositing a thin layer of microwave-interactive material, commonly aluminum, on a plastic base sheet. This layer may define an array of perforations, which preferably do not extend into either the plastic base sheet or into the sheet of paper. The perforations inhibit breakup of the susceptor when heated.

The plastic base sheet of the susceptor is subsequently bonded to a paper sheet, which may advantageously be about 15 to 50 lbs. weight, in a process which also coats the sheet of paper with an extruded layer of plastic resin approximately 1.0 mils thick. Both the plastic coating and the plastic base sheet are formed of polyethylene theraphthalate (PET) but differ in that the plastic base sheet is bi-axially oriented and very crystalline, while the extrudate is amorphous and has crystallinity of between about 5 and 10 percent and an intrinsic viscosity of about 0.7.

Another aspect of the invention relates to the formation of a laminate or container of the above construction. The microwave-interactive material is deposited on a base sheet, at which time perforations in this material can advantageously be formed. Since the base sheet is normally considerably longer than the needed susceptor, regularly spaced portions of the microwave-interactive material may be removed by demetallization, or alternatively, the base sheet may be cut into sections of the appropriate susceptor length. The paper sheet is coated with a plastic, preferably similar in composition to the base sheet, which is then extrusion-bonded to the paper sheet, without an adhesive, to form a laminate in which the microwave-interactive layer is sandwiched between a plastic-coated paper sheet and a plastic base sheet. This laminate can then be folded to form a container, such as a popcorn bag. The susceptor can be exposed on the inner surface of the container.

The present invention eliminates the need for conventional adhesives for bonding the susceptor to the paper sheet and may also be used to seal the disposable container formed from the laminate.

Other features and advantages of the invention will become apparent from the following description of the preferred embodiment taken in conjunction with accompanying drawings, which illustrate, by the way of example, the principles of the invention.

DETAILED DESCRIPTION OF THE INVENTION

Figure 1:
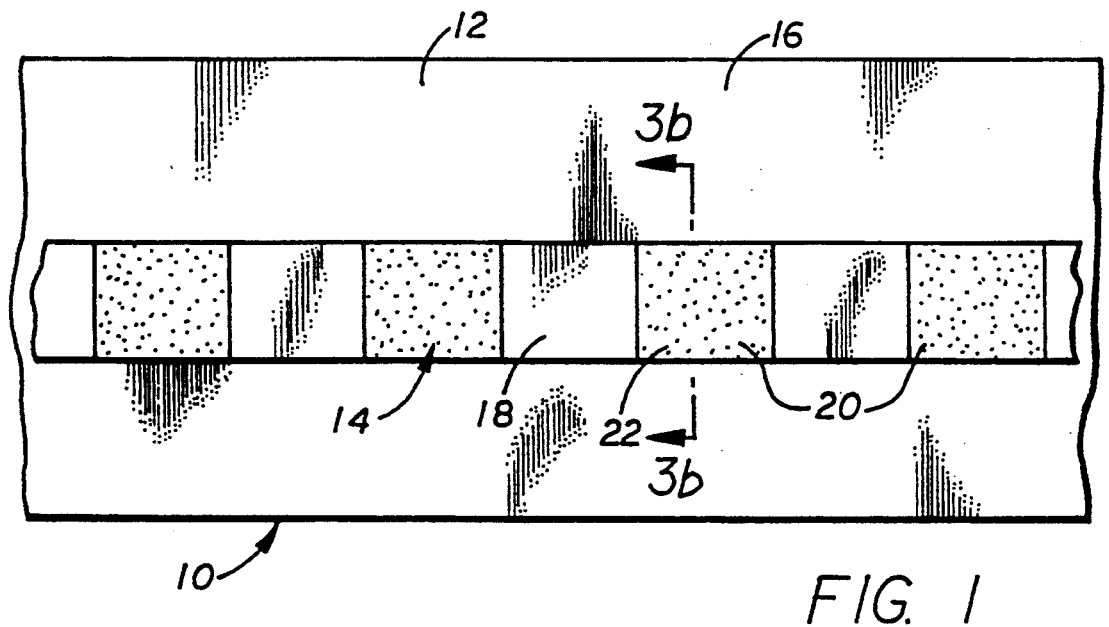
FIG. 1 is a top view of a laminate which includes a plastic base sheet with microwave-interactive coating forming rectangular susceptors, extrusion-bonded to a plastic-coated paper sheet.

A laminate 10, shown in FIGS. 1, 2, 3a and 3b of the accompanying drawings, is constructed in accordance with the present invention and suitable for use in a microwave oven. In general, the laminate 10 includes a paper sheet 12 to which a susceptor 14 is bonded. The laminate 10 may be used to form a disposable container for microwaveable food, such as a popcorn bag 15 described below and shown in FIG. 4.

The sheet 12 is preferably a single ply, machine-finished paper of between 15 and 50 lb. weight, the optimal weight being about 30 lbs. One side of the sheet 12 is extrusion coated. The coating 16, approximately 1.0 mils thick, prevents staining and serves as a liquid and gas barrier. To improve the adhesion of the plastic coating 16 to the paper sheet 12 is first flame treated and then corona treated, these processes being known to those skilled in the art.

A plastic that is particularly well suited for forming the coating 16 is amorphous polyethylene terephthalate (PET), particularly an extrusion-grade polyester resin made by Eastman Kodak and sold under the trade name Kodapak (also known as PET Resin #7352). The preferred plastic has a crystalline melt-point of 486° F., an intrinsic viscosity of about 0.7 (intrinsic viscosity being an indicator of molecular weight), and a crystallinity between about 5 and 10 percent.

The susceptor 14 includes a plastic base sheet 18, which is an elongated strip of crystallized, biaxially oriented PET of about 48 gauge. The base sheet 18 carries a thin layer 20 of microwave-interactive material, preferably a metal such as aluminum. The aluminum layer 20 is vacuum-deposited on one side of the base sheet 18.

An array of perforations 22 that help to inhibit breakup of the susceptor 14 during microwave cooking are formed by selectively demetallizing small areas of the aluminum layer 20. Although the perforations 22 extend fully through the aluminum layer 20, there are no corresponding openings in the base sheet 18 or the adjacent paper sheet 12, which remain unperforated.

The base sheet 18 bonds through the perforations 22 to the coating 16 of the paper sheet 12. Thus the perforations 22 permit a direct, if discontinuous bond between the base sheet 18 and the paper sheet 12. This direct bond helps to overcome the problems attributable to the different coefficients of thermal expansion of the aluminum layer 20, the paper sheet 12 and base sheet 18. Moreover, the bonding of the paper sheet 12 to the base sheet 18 is not fully dependent on the strength of the bonding of the aluminum layer 20 to the base sheet 18. The combined size of all the perforations 22 must be small enough that the ability of the susceptor 14 to generate heat is not substantially reduced. At the same time the perforations 22 must be large enough and numerous enough to serve this purpose.

Figure 2:
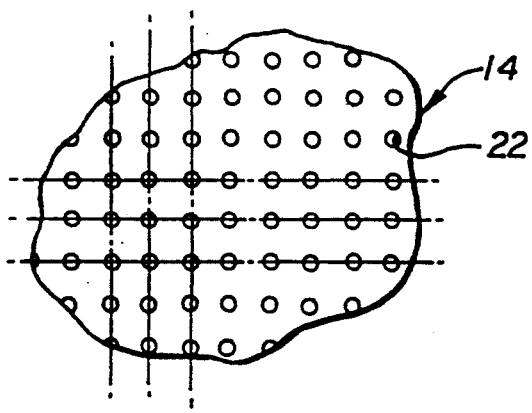
FIG. 2 is an enlarged, fragmentary plan view of the susceptor of the laminate shown in FIG. 1.
Figure 3A:
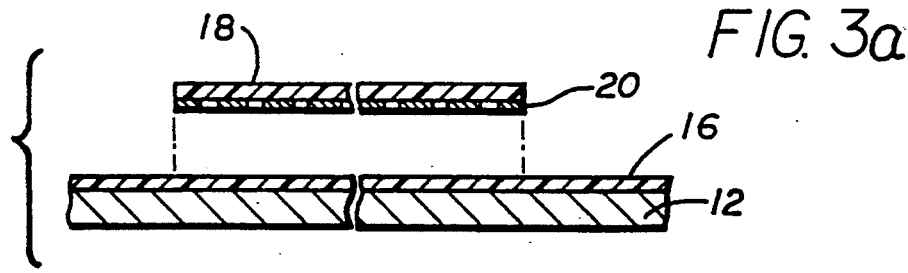
FIG. 3a is an enlarged (not drawn to scale) exploded fragmentary cross-sectional view of the laminate of FIG. 1 taken along line 3—3 of FIG. 1.
Figure 3B:
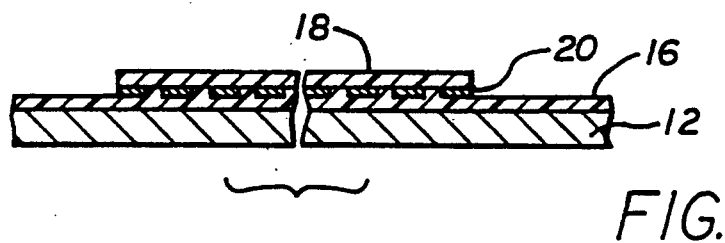
FIG. 3b is an enlarged (not drawn to scale) fragmentary cross-sectional view of the laminate of FIG. 1, taken along line 3—3 of FIG. 1.

It is advantageous to arrange the perforations 22 in a repeating geometric pattern, particularly parallel rows and perpendicular columns, as shown in FIG. 2. The perforations 22 are between about 0.025 and 0.060 inches (about 0.6 to 1.5 mm.) and preferably about 0.035 inches (or about 0.9 mm.) in diameter, spaced apart by about 1/16 of an inch (or 1.6 mm.) to 3/16 of an inch (or 4.76 mm.), and preferably about 3/32 of an inch (or about 2.4 mm.). The perforations 22 thus constitute less than 20 percent, and preferably less than 11 percent of the area within the outer boundaries of the aluminum layer 20.

It has been found that the perforations 22 substantially reduce cracking and break-up of the susceptor 14. More specifically, propagation of cracks in the aluminum layer, that are believed to be caused, at least in part, by the differing coefficients of thermal expansion of the material that forms the laminate 10, is significantly reduced by the presence of the perforations 22. This reduction in cracking is desirable to improve the integrity of the susceptor 14 and avoid unwanted reductions in eddy currents that are required for heating.

The perforations 22 can be formed by printing the aluminum layer 20 with an acid, such as hydrochloric acid, or with an alkaline etching solution, to produce the desired perforation pattern on the surface of the layer. The exposed aluminum reacts with the etching solution, forming an aluminum oxide. The oxide is then removed by a rinsing step, leaving behind the desired pattern of perforations 22 in the aluminum layer 20.

In some situations, it is desired that the plastic base sheet 18 be larger that the active area of the susceptor that corresponds to the aluminum layer 20. In fact, the base sheet 18 can be substantially larger than the susceptor 14 and may form an integral part of a container of which the susceptor is only a relatively small part, as described to some extent in U.S. Pat. No. 4,735,513 to Watkins et al. Under these circumstances, it may be desirable to first coat the entire base sheet 18 with aluminum and then remove the aluminum from areas that are not to be part of the susceptor 14 by the etching process described above.

The plastic base sheet 18 is bonded to the paper sheet 12 by the resin applied during the paper-coating process. In this process, the resin is extruded from a die at approximately 630° F. and spread to cover substantially the entire width of one side of the paper sheet 12. While the resin is still hot and tacky, the microwave-interactive layer of plastic base sheet 18 is pressed against the coating 16 of the paper sheet 12. The "nip pressure" compressing the laminate 10 thus formed in a calendering process is preferably between 80 and 100 pounds per linear inch. The still hot laminate is then wound over a teflon-coated chill-roll maintained at approximately 68° F. The rapid cooling of the laminate 10 sets the plastic coating 16, thereby firmly bonding the plastic base sheet 18 to the paper sheet 12. A cross-section of the laminate 10 formed in this manner is shown in FIG. 3. It should be noted that it is not necessary to use any adhesive, other than the resin itself, to form the laminate 10, thus eliminating any concerns about the suitability of a particular resin at the temperatures encountered during microwave cooking.

Although the laminate 10 is generally flexible and pliable, it is preferable to mount the susceptor 14 on a container panel that is substantially flat, since the microwave interactive aluminum layer 20 is apt to be stressed when folded, to generate excessive heat in the folded area, and to crack when the susceptor 14 heats up. It is also preferable not to mount the susceptor 14 on or near a bonded seam of a container, since the intense heat generated by the susceptor during cooking is likely to weaken the seam.

Figure 4:
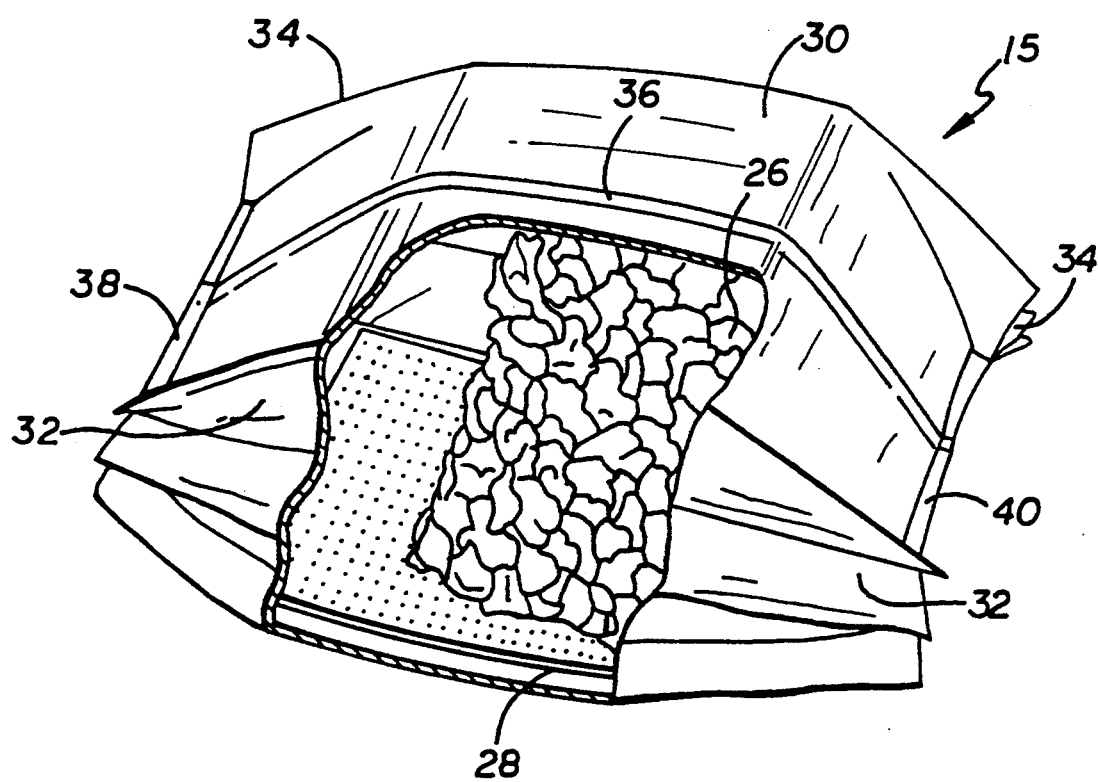
FIG. 4 is a perspective view, partly in cut-away section, of an expanded bag of popcorn, formed from the laminate of FIG. 1 (some of the corn being removed to reveal the susceptor).

An exemplary container 15 made from the laminate 10 in accordance with the above guidelines is a popcorn bag, shown in FIG. 4. This bag 15 contains an edible charge 26 of ready-to-pop corn, shortening, salt and possibly seasoning. The bag 15 is a "tube" type, with generally smooth front panel 28 and back panel 30, connected by two gusseted and expandable side panels 32 and 34. The bag 15 has a wedge-shaped top 38 and bottom 40. The front panel 28, on which the bag 15 lies during cooking in a microwave oven (not shown), is seamless, whereas the back panel 30 has a longitudinal seam 36. The seam 36 is a fin seal formed by bonding the opposing, PET-coated inside edges of laminate 10. The wedge-shaped top 38 and bottom 40 are formed by bonding the respective inside edges of the front panel 28 to the inside edges of the back panel 30. The susceptor 14 is mounted on the seamless front panel 28, and does not extend into the side panels 32 and 34, or the top and bottom seams.

Although molten amorphous PET resins such as Kodapak adhere to a crystallized PET such as the plastic base sheet 18, the resulting bond is not as strong as that formed between two layers of amorphous PET material. Consequently, when the plastic base sheet 18 does not extend into the top and bottom seams 38 and 40, respectively, of the bag 15, stronger seams can be advantageously formed by heating and pressing together the edges of the Kodapak-coated interior surfaces of the front panel 28 back panel 30. Similarly, the extruded Kodapak coating may be used to seal the longitudinal seam 36 on the back panel 30.

Thus, the extruded coating 16 may be used to form the laminate 10 as well as to seal the bag 15 formed from the laminate, without the use of adhesives. The use of extruded PET coating in place of an adhesive can improve the bond of the susceptor 14 to the paper sheet 12 particularly when perforations 22 are included in the aluminum layer 20, thus reducing the likelihood of susceptor delamination and breakup during cooking.

While a particular form of the invention has been illustrated and described, it will be apparent that various modifications can be made without departing from the spirit and scope of the invention. Accordingly, it is not intended that the invention be limited, except as defined by the appended claims.

I claim:

1. A popcorn bag for use in microwave cooking formed at least in part from a laminate, comprising:
   a thin layer of microwave-interactive material defining an array of perforations and a polyethylene terephthalate base sheet on which said layer is directly deposited to form a susceptor; and
   a paper sheet having a polyethylene terephthalate coating thereon, where said base sheet is formed of bi-axially oriented, crystalline polyethylene terephthalate and said coating is formed of amorphous polyethylene terephthalate having a crystallinity between about 5 and 10 percent and an intrinsic viscosity of about 0.7;
   said base sheet being extrusion bonded to said coating.

2. The popcorn bag of claim 1, wherein said coating is about 1.0 mils thick.

3. The popcorn bag of claim 1, wherein said paper sheet is about 15 to 50 lb. weight.

4. The popcorn bag of claim 1, wherein said microwave-interactive material is at least partly aluminum.

5. The popcorn bag of claim 1, wherein said coating is about 1.0 mils thick and said paper is about 15 to 50 lb. weight.

6. The popcorn bag of claim 1, wherein said perforations are arranged in a repeating geometric pattern.

7. The popcorn bag of claim 1, wherein said perforations are substantially round, about 0.060 inches or less in diameter and arranged in a repeating geometric pattern.

8. The popcorn bag of claim 1, wherein said perforations are arranged in parallel rows and columns perpendicular to said rows, spaced at regular intervals of between about 1/16 and 3/16 of an inch.

9. The popcorn bag of claim 1, wherein said perforations are substantially round, about 0.060 inches or less in diameter, arranged in parallel rows and columns perpendicular to said rows, spaced at regular intervals of between 1/16 and 3/16 of an inch.

10. The popcorn bag of claim 1, wherein the combined surface area of said perforations represents less than about 20 percent of the surface area of said microwave interactive material.

11. The popcorn bag of claim 1, wherein neither said base sheet nor said paper sheet has perforations corresponding to said perforations defined by said microwave-interactive material.

12. The popcorn bag of claim 1, wherein the layer of microwave-interactive material is disposed between said plastic base sheet and said plastic coating.

13. A popcorn bag for use in microwave cooking formed at least in part from a laminate, comprising:
    a thin layer of microwave-interactive material and a polyethylene terephthalate base sheet on which said layer is directly deposited to form a susceptor; and
    a paper sheet having a polyethylene terephthalate coating thereon, where said base sheet is formed of bi-axially oriented, crystalline polyethylene terephthalate and said coating is formed of amorphous polyethylene terephthalate having a crystallinity between about 5 and 10 percent and an intrinsic viscosity of about 0.7;
    said base sheet being extrusion bonded to said coating.

* * * * *